United States Patent [19]

Kitabayashi

[11] 4,337,052
[45] Jun. 29, 1982

[54] WAVE ENERGY PROPELLING MARINE SHIP

[76] Inventor: Seiichi Kitabayashi, No. 919-12, Oaza Koshikiya, Ageo-shi, Saitama, Japan

[21] Appl. No.: 83,792

[22] Filed: Oct. 11, 1979

[30] Foreign Application Priority Data

Jul. 10, 1979 [JP] Japan ................................ 54-86514

[51] Int. Cl.³ ........................................... B63H 19/02
[52] U.S. Cl. ...................................................... 440/9
[58] Field of Search .................... 440/8, 9, 10, 90, 98, 440/99; 60/495–499, 501, 502; 415/2, 6, 7; 416/84, 119; 417/61

[56] References Cited

U.S. PATENT DOCUMENTS

| | | | |
|---|---|---|---|
| 550,580 | 12/1895 | Bluemel | 440/99 |
| 833,361 | 10/1906 | Wilmore | 415/17 |
| 1,041,232 | 10/1912 | Berry | 440/98 |
| 4,104,536 | 8/1978 | Gutsfeld | 416/119 |

FOREIGN PATENT DOCUMENTS 3767 11/1900 Austria ................................ 415/6
566836 11/1923 France ................................ 440/9
810834 3/1937 France ................................ 60/501
192008 7/1937 Switzerland ....................... 440/100

Primary Examiner—Trygve M. Blix
Assistant Examiner—Jesús D. Sotelo
Attorney, Agent, or Firm—Fulwider, Patton, Rieber, Lee & Utecht

[57] ABSTRACT

A wave energy propelling marine ship comprises a cylindrical ship body having a hollow space therein for transporting fluid material therewithin, a ship body disposed in or on the sea; a propeller attached to the ship body for the purpose of propelling the marine ship for sailing; a rudder for controlling the moving direction of the marine ship; at least one rotary device which includes a plurality of compartments which are each partitioned into a plurality of water chambers by a plurality of radial plates, and a plurality of water charge and/or discharge ports, wherein wave energy is converted into mechanical energy; and device for adjusting buoyancy of the marine ship so that the rotary device is positioned advantageously on the sea surface.

1 Claim, 7 Drawing Figures

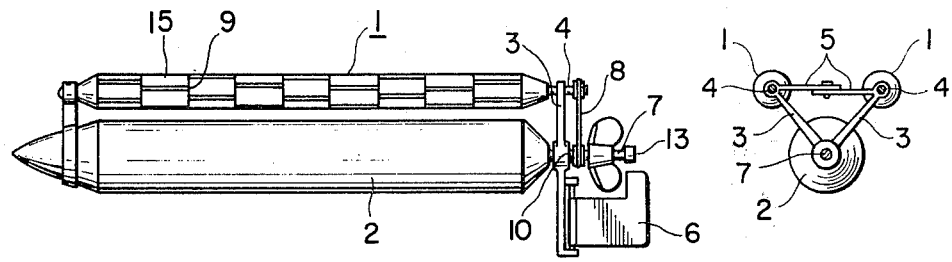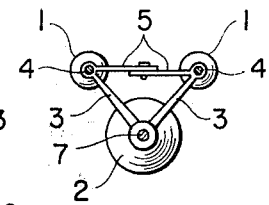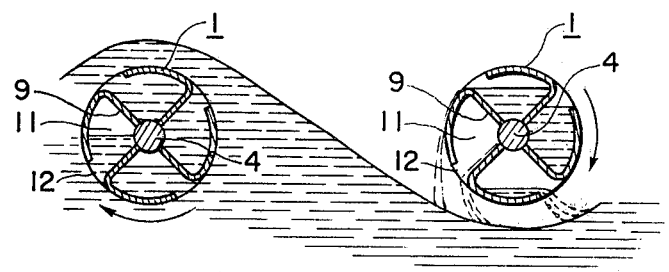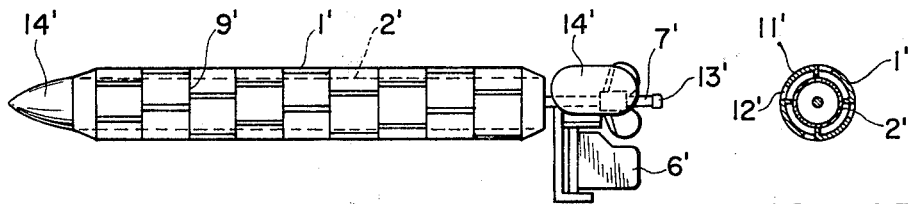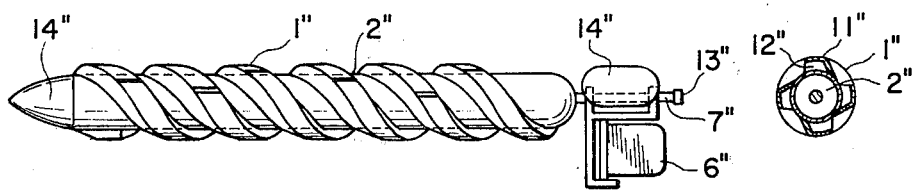

WAVE ENERGY PROPELLING MARINE SHIP

BACKGROUND OF THE INVENTION

The present invention relates to a wave energy propelling marine ship, and more particularly relates to a ship which is provided with a pair of rotary members which are rotated by the action of the surface waves of the body of water through which the ship is propelled, the propulsion being effected by a propeller driven by the wave generator system. Ships that can be propelled by energy of waves in the sea without any additional driving source are known in the art. However, the prior art ship has been characterized by low efficiency of wave energy converting means, and is relatively large in size and complicated in construction.

SUMMARY OF THE INVENTION

An object of the present invention is to provide a novel wave energy propelling ship effectively using a wave energy in the sea through wave energy converting means.

This and other objects are achieved by providing a wave energy propelling marine ship comprising: A cylindrical ship body having a hollow space therein for transporting fluid material therewithin, the ship body disposed in or on the sea; propeller means for propelling said marine ship for sailing; rudder means for controlling the moving direction of the marine ship; rotary means including a plurality of compartments which are each partitioned into a plurality of water chamber by a plurality of radial plates, and a plurality of water charge and/or discharge ports, wherein wave energy is converted into mechanical energy; and adjusting means for adjusting buoyancy according to the whole marine ship so that the rotary means is positioned on the sea surface.

BRIEF DESCRIPTION OF THE DRAWINGS

In the accompanying drawings:

FIG. 1A is a side view of a marine ship of the first embodiment according to the present invention;

FIG. 1 B is a schematic front view of the ship shown in FIG. 1A, a part of which is omitted for a ready understanding;

FIG. 2 is a cross section of the rotary members used in the ship shown in FIGS. 1A and B;

FIG. 3A is a side view of a marine ship of the second embodiment according to the present invention;

FIG. 3B is a cross section of the ship shown in FIG. 3A;

FIG. 4A is a side view of a marine ship of the third embodiment according to the present invention; and FIG. 4B is a cross section of the ship shown in FIG. 4A.

DETAILED DESCRIPTION OF THE INVENTION

Referring now to the accompanying drawings, a ship body 2 is provided with a pair of rotary members 1. The ship body 2 is connected to the rotary members 1 through arms 3 at its front and rear ends. The rotary members 1 are rotatably connected to each other by two pairs of connecting rods 5 at their front and rear ends as shown in FIGS. 1A and B. The distance between rotary members are adjustable by increasing or decreasing the overlapped portion of the connecting rods 5.

A rudder means 6 is provided at the rear end of the ship body 1 on an extending sleeve 10. A screw propeller shaft 7 extends from an inner portion of the sleeve 10. Rotating shafts 4 extending from the rotary members 1 are connected to the screw propeller shaft 7 by a pair of transmission chains 8 through clutch means (not shown).

Each of the rotary members 1 is so constructed that the inner portion of the rotary member 1 is divided into a plurality of compartments 15 by a plurality of partition walls 9 in the longitudinal direction as shown in FIG. 1A and each partitioned compartment 15 is further divided by a plurality of radial plates 9 into a plurality of water chambers 11 as shown in FIG. 2. Each water chamber 11 is provided with a communication hole 12 communicating with the outside. The communicating hole is provided at the trailing end of each of the water chambers 11. The radial plates in one compartment are displaced to the radial plates in the other adjacent compartment in phase in order to obtain a flat torque characteristics.

the ship body 2 has a hollow space therein so as to load crude oil or the like to be transported. It is desirable that the load material is charged or discharged through a coaxial hollow space in the screw propeller shaft 7. Reference numeral 13 designates a cap member.

With such construction, the amount of fluid material loaded within the ship body 2 is adjusted so that the rotary members 1 can be disposed just on the wave surface. As shown in FIG. 2, the chambers containing air have buoyancy in the water while the chambers containing water have self-gravity in the air to thereby rotate the rotary members. Since the compartments are displaced to each other in phase and two rotary members are used, a uniform torque is generated to thereby advance or propel the ship body. Further, since the communication ports are provided at the respective trailing end of the associated chambers, in any compartment even in either rotary member, one-directional rotating force can be obtained.

In case where the ship according to the present invention is disposed in the sea near the seaside, the ship can sail along the seaside line. If an automatic control means is provided to the rudder means 6 of the ship, the ship can travel anywhere.

FIGS. 3A and B show a second embodiment of the present invention, in which the like rotary member 1' is coaxially provided directly around the substantially overall periphery of the ship body 2'. The outer rotary structure 1' is rotatable together with the ship body 2'. In the same manner as the first embodiment, a plurality of chambers 11' are formed in the rotary structure 1'. A propeller shaft 7' extending from the rear end of the ship body 2' serves as a propeller shaft and also as a pipe for loading or discharging the fluid material. In order to impart a sufficient buoyancy to the whole ship body, buoy tanks 14' are attached to the front and rear ends, respectively. In this case, the propeller shaft 7' is rotatable with respect to the rear buoy tank 14', and the propeller shaft is stationary relatively to rudder means 6'. Reference numeral 13' designates a cap. In this construction, any transmission means is not required.

FIGS. 4A and B show a third embodiment according to the present invention, in which a spiral rotary structure 1" is provided around a ship body 2". In this ship, the rotary structure is spiral and the inner chambers are partitioned by a plurality of partition walls at a predetermined intervals to form a plurality of water chambers. Communicating holes 12" are provided to the respective chambers as shown in FIG. 4B. In this construction, the spiral form per se functions as propeller means. Therefore, the transmission means and the propeller can be dispensed with. In the same manner as in the preceding embodiments, buoy tanks 14", cap 13", shaft 7" and rudder means 6" are provided in this ship.

What is claimed is:

1. A wave energy propelled marine ship for disposition on or in the sea and comprising:

a cylindrical ship body having a hollow space therein for transporting fluid material therewithin;

propulsion means for propelling said marine ship;

rudder means for controlling the moving direction of the marine ship;

rotary means around substantially the overall peripheral surface of said ship body and rotatable therewith, said rotary means including a rotary shaft, a rotary hollow sleeve concentrically mounted upon said rotary shaft for rotation therewith in a single rotational direction, a plurality of plates arranged radially from the axis of said shaft to the inside surface of said rotary sleeve to securely form a plurality of water chambers and a plurality of water ports, each of said ports formed in the trailing edge of each water chamber adjacent to the radial plate of each water chamber wherein wave energy is converted into rotary mechanical energy;

transmission means for driving said propulsion means from said rotary means; and, adjusting means for adjusting bouyancy of the whole marine ship so that the rotary means is positioned on the sea surface.

* * * * *